O. L. SAMSON & J. R. DILL.
Improvement in Pruning-Shears.
No. 131,830. Patented Oct. 1, 1872.
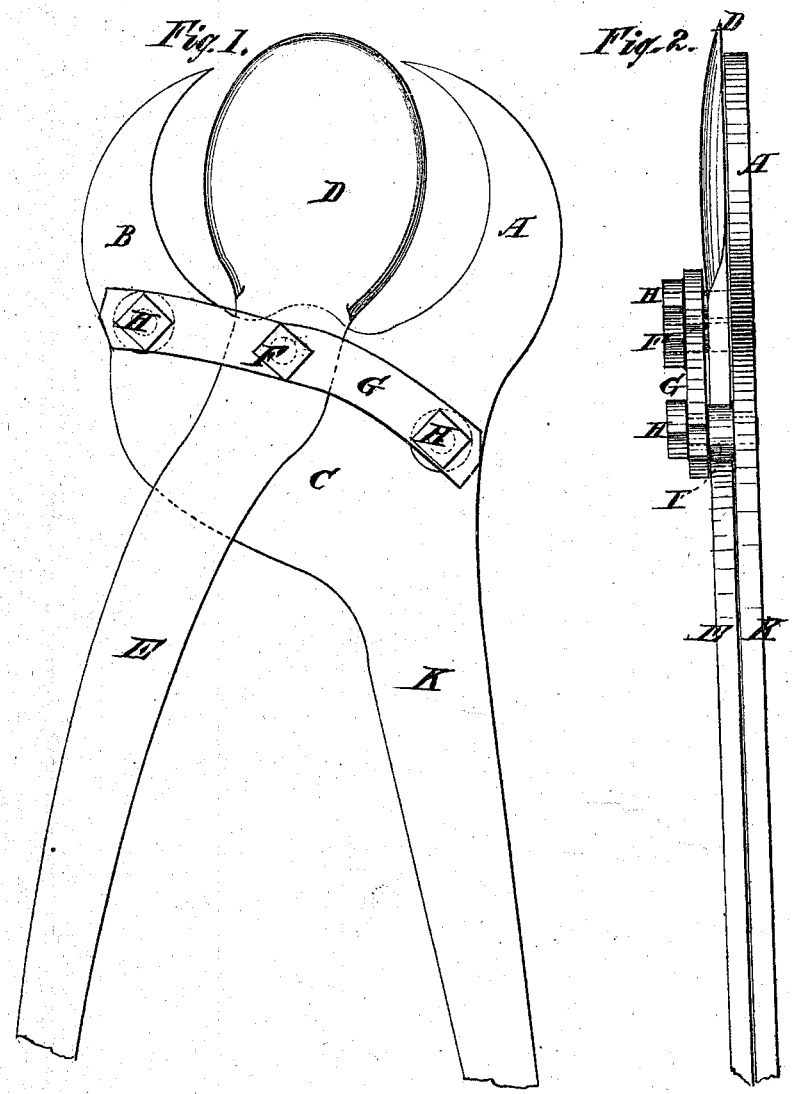

UNITED STATES PATENT OFFICE.

OWEN L. SAMSON AND JAMES R. DILL, OF CRAWFORDSVILLE, IOWA.

IMPROVEMENT IN PRUNING-SHEARS.

Specification forming part of Letters Patent No. 131,830, dated October 1, 1872.

*To all whom it may concern:*

Be it known that we, OWEN L. SAMSON and JAMES R. DILL, of Crawfordsville, in the county of Washington and State of Iowa, have invented a new and Improved Pruning-Shears, of which the following is a specification:

Our invention belongs to the class of shears for pruning purposes wherein a double-edged cutter is arranged to operate in conjunction with a fixed cutter on either side; and it consists, mainly, in the arrangement of a guide and brace-bar with the oscillating or movable cutter, as hereinafter described.

Figure 1 is a side elevation of our improved pruning-shears, and Fig. 2 is another side elevation taken in a plane perpendicular to that of Fig. 1.

Similar letters of reference indicate corresponding parts.

A and B represent two hook-shaped cutters attached to one plate, C, and fronting each other, so as to be acted on by the oval double-edged cutter D, which is formed on the end of the movable handle E, which is pivoted to the plate C, to which the other cutters are connected, at a point a little below the middle of the space between said two cutters, by a bolt, F, which passes through said plate C at one side of D, and through a bar, G, at the other side, which said bar is bolted to the plate C by the bolts H, with washers I between to separate it from said plate far enough to provide room for the cutter D E, allowing it to vibrate freely, but at the same time confining it so that its cutting-edges will be caused to act properly with the edges of A B. These washers are used instead of a positive connection of the bar G with the plate C, to allow of filing them off from time to time as the parts wear so as to become loose. The plate C and its cutters A B are attached to the handle K.

The arrangement which we thus propose affords a very reliable and serviceable double-acting instrument of simple and cheap construction, that may be very readily adjusted as required from time to time.

Having thus described our invention, we claim as new and desire to secure by Letters Patent—

A double-acting pruning-shears, comprising the plate C, cutters A B D, levers E K, bar G, washers and bolts F H, all constructed and arranged substantially as specified,

OWEN L. SAMSON.
JAMES R. DILL.

Witnesses:
DAVID W. DILL,
JAMES B. DUNN.